Aug. 13, 1968     D. J. DADDONA, JR     3,396,436
SNAP FASTENER ASSEMBLY
Filed March 2, 1966
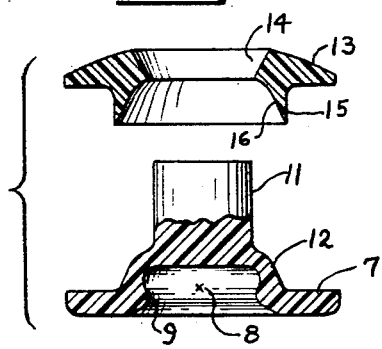
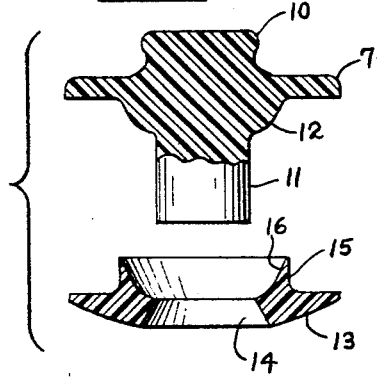
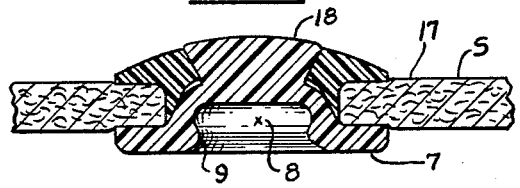
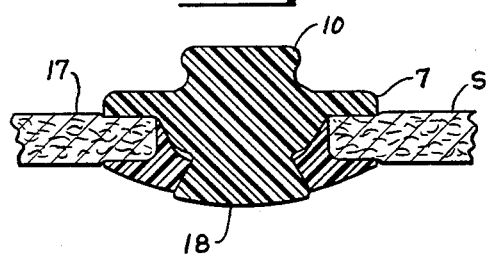
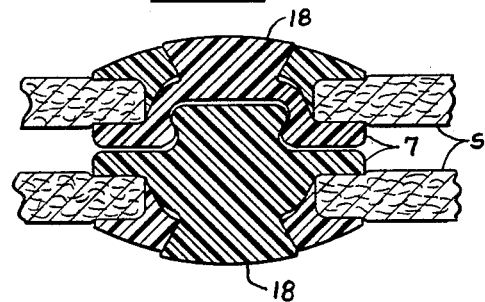
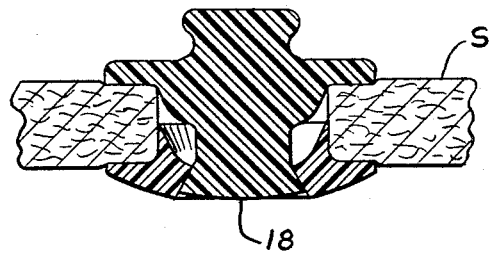

United States Patent Office 3,396,436
Patented Aug. 13, 1968

3,396,436
SNAP FASTENER ASSEMBLY
Domenic J. Daddona, Jr., Waterbury, Conn., assignor to Scovill Manufacturing Company, Waterbury, Conn., a corporation of Connecticut
Filed Mar. 2, 1966, Ser. No. 531,257
3 Claims. (Cl. 24—208)

ABSTRACT OF THE DISCLOSURE

An all plastic snap fastener especially intended for articles of leather or the like has a post projecting away from each of the fastening means, through a ring-like attaching member. The post is riveted over a countersunk recess in the attaching member, and a skirt portion on the attaching member surrounds the post so that when the plastic material of the post expands in the upsetting operation, the leather material will not be wrinkled.

---

This invention is an improved snap fastener assembly which is especially useful where snap fasteners are attached to leather belts.

The assembly resembles in general, the fastener shown in the patent to Jensen 3,159,890 wherein an integral post extends rearwardly from the fastener element through a hole in the support material and through a washer-like attaching member with the post being riveted over such member.

In prior assemblies of this kind, the post is made to fit the hole in the support for locating the fastener properly, and this has been found objectionable particularly when applied to leather because of the upsetting of the post material which might cause the leather to swell out or wrinkle around the hole.

Accordingly, it is an object of this invention to provide an improved construction which will properly locate and hold the fastener on the support without any swelling out or wrinkling of the support material.

A further object is to provide an improved attaching member with an interior lead-in surface for the post which is made smaller than the hole through the support. This is accomplished by a skirt depending from the washer-like attaching member, which skirt fits into the hole in the support material.

Another important advantage provided by an attaching member with a supporting skirt is that it can be more easily oriented and fed in an automatic assembling machine.

Other objects and advantages will hereinafter more fully appear.

In the accompanying drawing, I have shown for purposes of illustration, one embodiment which the invention may assume in practice. In the drawing:

FIG. 1 shows the two separate parts of a female snap fastener principally in central section;

FIG. 2 shows two separate parts utilizing the invention in a stud element assembly principally in central section;

FIG. 3 is a central section of the completed assembly of the female fastener element;

FIG. 4 is a similar view showing the stud fastener element;

FIG. 5 is a central section through both stud and socket assemblies fastened together; and FIG. 6 indicates the performance of the assembly where the support material is somewhat thicker than indicated in FIGS. 3, 4 and 5.

The socket element has a base flange 7 with a centrally located socket 8 having a constricted entrance 9 adapted to snap over the bulbous head 10 of a mating stud element. Both the stud and socket elements are made of a plastic material which is capable of being cold-formed, one example of such material being known as "Delrin."

Projecting rearwardly is a solid cylindrical post 11 which connects to the flange 7 by an arched portion 12. The attaching member which is generally in the shape of a washer has a curved upper surface 13 and the countersunk aperture 14 adapted to fit around the post 11. It also has the depending skirt 15 spaced a substantial distance outwardly from the aperture 14 and an interior surface 16 which slopes toward the aperture 14.

The stud element and its attaching member, except for the shape of the central fastening means, are the same as have been described with reference to the socket element and similar numbers 7 and 11 to 16 designate corresponding parts.

The support material, which may be leather, is labeled S, and to accommodate either the stud or socket element, it has a prepunched hole 17 which is substantially larger than the transverse cross-sectional size of the post 11. In the final assembly, the base flange 7 bears against one face of the support S, the attaching member against the other side of the support and the post 11 extends through the countersunk aperture 14 where it is upset or riveted into the form of a conical head 18. The upset end portion of the rivet is remote or spaced axially away from the socket or stud fastening means so that any deformation of the plastic material in the riveting operation will not affect the dimensions of the fastener engaging portions.

During assembly, the skirt portion 15 of the attaching member is fitted into the hole 17 in the support S for locating the fastener centrally of the hole and preventing it from shifting on the support during use. When the fastener element is being inserted, the inclined surface 16 on the interior of the skirt 15 will guide or lead the post 11 into the aperture 14.

During upsetting of the post to form the head 18, there is no likelihood of pushing out or wrinkling the leather since the post does not directly contact the leather. At the same time, the construction permits of greater variations in the thickness of the support material than prior constructions. In the case of the assembly with relatively thinner materials as seen in FIGS. 3, 4 and 5, the material of the post may provide a head which projects somewhat above the curved surface 13, and at the same time some of the excess material may swell out inside the skirt 15.

On the other hand, with thicker material as shown to an exaggerated degree in FIG. 6, the post will anchor firmly in the countersunk aperture 14 even with a somewhat depressed level of the head 18.

What I claim is:
1. A snap fastener assembly comprising
  (a) a support having a hole therethrough;
  (b) a one-piece fastener element consisting of plastic material having a base flange bearing against one face of said support, preformed centrally located fastening means adapted for engagement with a mating snap fastener element, and a post projecting through and beyond said hole in the support, said post being substantially smaller in transverse cross-section than said hole;
  (c) an attaching member having a portion bearing against the other face of said support and having an aperture for receiving said post, the outer portion of said post being spaced axially away from said fastening means and upset into tight engagement with the wall of said aperture; and
  (d) a skirt on said attaching member which is radially spaced from at least one portion of the perimeter of said aperture, said skirt fitting into said hole in the support.

2. A snap fastener assembly as defined in calim 1 wherein said skirt has an interior surface which slopes toward said aperture to lead said post into said aperture during assembly of the parts.

3. A snap fastener assembly as defined in claim 1 wherein said aperture in the attaching member is countersunk and wherein the outer end of said post is upset in said countersunk aperture.

References Cited

UNITED STATES PATENTS 2,187,296   1/1940   Appel _____ 24—220

BOBBY R. GAY, *Primary Examiner.*

E. SIMONSEN, *Assistant Examiner.*